April 28, 1953    G. W. MASON ET AL    2,636,307
FISHHOOK SECURING MEANS
Filed July 11, 1949

Inventors
Bruce D. Gee
George W. Mason
BY
Frank C. Fearman
ATTORNEY

Patented Apr. 28, 1953

2,636,307

UNITED STATES PATENT OFFICE 2,636,307

FISHHOOK SECURING MEANS

George W. Mason and Bruce D. Gee,
Otisville, Mich.

Application July 11, 1949, Serial No. 104,011

1 Claim. (Cl. 43—44.83)

This invention relates to fishhooks and more particularly to means for securing a fishhook in adjusted, predetermined position on a line or leader.

One of the prime objects of the invention is to design a very simple, practical, and relatively inexpensive means for securing the hook in any desired position of adjustment on a leader.

Another object of the invention is to provide a resilient, readily operable means which can be easily and quickly shifted from locked to unlocked position without the use of tools of any kind.

A further object of the invention is to provide an adjustable, resilient hook holder, which can be utilized for locking the hook in any desired position of adjustment on a leader, so that the hook can be set to accommodate the length of bait that is to be used.

Another object is to provide a hook securing means which can be readily manufactured and assembled, and which is extremely simple to apply and operate.

To the accomplishment of the foregoing and related ends, said invention then consists of the means hereinafter fully described, and particularly pointed out in the appended claim, the annexed drawing and following description setting forth, in detail, certain means and one mode of carrying out the invention, such disclosed means and mode illustrating, however, but one of the various ways in which the principle of the invention may be used.

Figure 1:
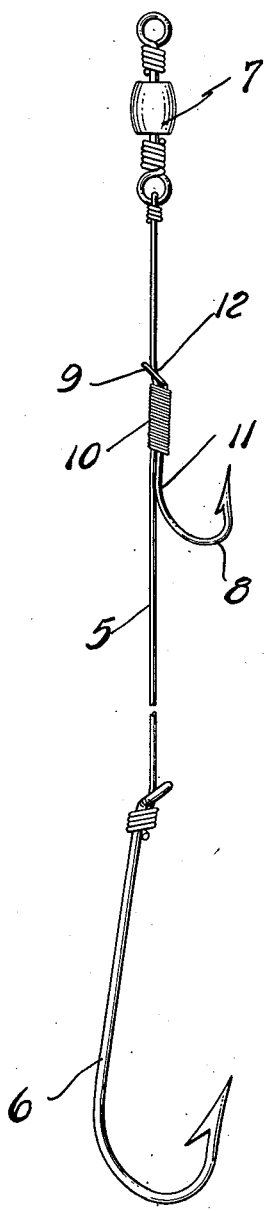
Fig. 1 is a side-elevational view showing a hook adjustably mounted on a leader and secured in locked position thereon.

Referring now more specifically to the drawing in which we have shown the preferred embodiment of our invention, the numeral 5 indicates a length of leader of conventional design having a conventional fishhook 6 tied or otherwise secured to the lower end thereof, and a swivel connection 7 is provided on the upper end of the leader and to which the line (not shown) is connected in the usual manner.

The hook 8 is adjustably mounted on the leader 5 and is formed with an offset eye 9 having an opening through which the leader 5 is threaded, and a helically wound spring 10 is mounted on the shank 11 of the hook, said spring being formed on an automatic machine (not shown), and being cut to length to suit the hook on which it is used.

Figure 2:
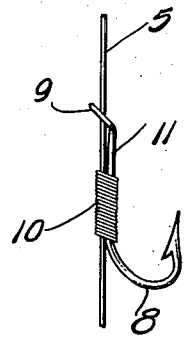
Fig. 2 is a fragmentary side-elevational view of the adjustable hook and leader including the instant invention, the securing means being shown in unlocked position.
Figure 3:
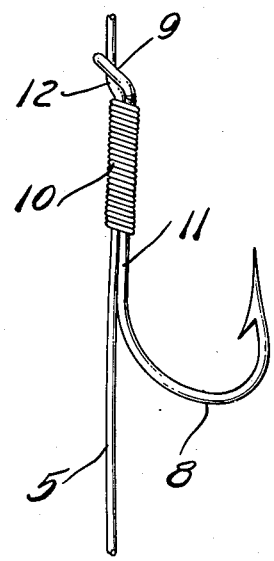
Fig. 3 is an enlarged, fragmentary, side-elevational view showing the adjustable hook locked in position on the leader.

The position of the hook 8 on the leader is determined by the length of bait that is to be used, and when it is desired to shift the hook on the leader, the spring 10 is shifted to position as clearly shown in Fig. 2 of the drawing, and the hook will be freely shiftable on the leader 5. When the hook has been shifted to desired position, the spring member 10 is forced upwardly on the shank of the hook, until it engages against the underside of the offset eye 9, thus kinking the leader 5 at the point 12 (see Fig. 3), and securely holding the hook in set position. To release, it is merely necessary to force the spring down on the shank, and the hook is again free to slide.

From the foregoing description, it will be obvious that we have perfected a very simple, practical and relatively inexpensive means for securing hooks in adjusted position on leaders and the like.

What we claim is:

A fishhook formed with an elongated shank having an outwardly turned upper end and an eye therein forming an opening, a tightly wound spring slidably mounted on said shank and a flexible line leading through said eye opening and said spring with the fishhook with spring thereon slidably mounted on said line, the opening being offset axially from the shank, the spring being of an internal diameter to snugly accommodate the flexible line and the shank of the fishhook therein, said spring in one position tightly locking the fishhook in set position on the line, and in another position permitting free sliding movement of the fishhook and coil spring on said line.

GEORGE W. MASON.
BRUCE D. GEE.

References Cited in the file of this patent

UNITED STATES PATENTS

| Number | Name | Date |
|---|---|---|
| 171,769 | Buel | Jan. 4, 1876 |
| 801,649 | Coffin | Oct. 10, 1905 |
| 1,156,152 | Krenrick | Oct. 12, 1915 |
| 1,163,244 | Lawrence | Dec. 7, 1915 |
| 1,307,411 | Moore | June 24, 1919 |
| 1,516,940 | Winchell | Nov. 25, 1924 |
| 2,457,428 | Worden | Dec. 28, 1948 |